United States Patent [19]

Raj

[11] Patent Number: 4,531,846
[45] Date of Patent: Jul. 30, 1985

[54] COMPACT FERROFLUID SEAL AND BEARING ASSEMBLY

[75] Inventor: Kuldip Raj, Merrimack, N.H.

[73] Assignee: Ferrofluidics Corporation, Nashua, N.H.

[21] Appl. No.: 565,333

[22] Filed: Dec. 27, 1983

[51] Int. Cl.³ .................. B65D 33/74; F16C 1/24; F16C 33/74
[52] U.S. Cl. .................... 384/478; 277/80; 277/135; 384/133
[58] Field of Search .............. 308/187.1, 187.2, 187, 308/189 R; 384/133, 478, 446; 277/80, 137, 135

[56] References Cited

U.S. PATENT DOCUMENTS

| | | |
|---|---|---|
| 3,620,584 | 11/1971 | Rosensweig ............... 308/187.1 |
| 4,293,137 | 10/1981 | Ezekiel ............... 308/187.1 X |
| 4,407,508 | 10/1983 | Raj et al. ............... 277/135 X |

FOREIGN PATENT DOCUMENTS 0051124  4/1980  Japan ..................... 384/478

Primary Examiner—Stuart S. Levy
Assistant Examiner—Lynn M. Sohacki
Attorney, Agent, or Firm—Richard P. Crowley

[57] ABSTRACT

The compact ferrofluid seal and radial bearing assembly, particularly useful for the support and sealing of a shaft, such as a computer disk drive shaft, where space is at a premium, which assembly comprises a magnetically-permeable radial bearing apparatus having inner and outer race elements, moveable elements, and a cage element to retain the moveable elements, and a ferrofluid single-stage seal apparatus comprising a radially-polarized permanent magnet to retain a sealing amount of ferrofluid in a radial gap between the inner and outer race elements.

8 Claims, 2 Drawing Figures

COMPACT FERROFLUID SEAL AND BEARING ASSEMBLY

BACKGROUND OF THE INVENTION

Single-, dual-, or multiple-stage ferrofluid seals are usefully employed for forming one or more ferrofluid sealing O-rings about a shaft element to provide for sealing of the shaft element. Ferrofluid seals are often useful with bearing assemblies in order to prevent the bearing lubricants from reaching areas that must be free of contamination. Typically such ferrofluid seals used with bearing assemblies are usually exclusion-type seals, that is, they need to withstand typically a gas pressure difference of only 5–25 inches water per ferrofluid stage.

Bearing assemblies are required in the operation of rotatable shafts, particularly to provide low friction support for rotatable shaft. Generally such bearing assemblies would include radial or thrust bearings, but particularly, radial bearings wherein moveable elements, such as a ball bearing, are retained between inner and outer races by a ball bearing cage. Ferrofluids have been employed in ferrohydrodynamic low-friction ball bearings wherein the rolling element of the ball bearing is suitably magnetized so as to provide a source of magnetic flux to retain the ferrolubricant or ferrofluid within the bearing, such as, for example, as disclosed in U.S. Pat. No. 3,746,407, issued July 17, 1973.

Often bearing assemblies and ferrofluid seal apparatus must be employed where space is at a premium, such as, for example, in small high-speed rotating shafts or spindles, such as in computer disk drives, or textile spindles, or similar operations. Therefore, it is desirable to provide a compact, composite ferrofluid seal and radial bearing assembly wherein the radial bearing assembly provides support for the shaft and the shaft is suitably sealed by an exclusion ferrofluid seal.

SUMMARY OF THE INVENTION

The invention relates to a compact, composite, ferrofluid seal and bearing assembly and to the method of operation of such assembly. In particular, the invention relates to a compact, composite, ferrofluid seal and radial bearing assembly useful for a computer disk drive operation wherein a single-stage radially-polarized permanent magnet is employed and wherein the magnetic flux lines pass through the components of the radial bearing assembly apparatus.

A compact, composite, ferrofluid seal and radial bearing assembly has been discovered, said assembly provides a ferrofluid seal and radial support to a rotatable shaft and said assembly is particularly compact so it may be usefully employed where space is at a premium, such as in computer disk drive assemblies.

The compact ferrofluid seal and bearing assembly of the invention comprises a radial bearing apparatus composed of inner and outer spaced-apart race elements, the race elements containing a plurality of moveable elements, such as rollers or more typically ball bearings disposed between the inner and outer race elements, and cage or other means to retain the moveable elements within the race elements. The race elements are adapted for movement relative to each other and the inner or outer element may be secured to a moving surface and typically the exterior surface of the inner race element is secured to the exterior surface of a rotatable shaft. For use in the invention the bearing apparatus should be composed of magnetically-permeable inner and outer race elements and magnetically-permeable moveable elements and optionally, if desired, magnetically-permeable cage means so as to permit magnetic flux lines to flow through the bearing apparatus.

The bearing apparatus typically has a ferrolubricant or other lubricant-type material which is required for the low-friction operation of the rotatable shaft; however, which material is to be prevented from entering the contamination-free environment by the employment of a ferrofluid O-ring exclusion seal between the contamination-free environment and the bearing apparatus.

The ferrofluid seal apparatus which is disposed within the bearing assembly to form the compact, composite assembly of the invention comprises a ferrofluid seal apparatus placed within the inner and outer race elements and positioned closely adjacent to the moveable elements and between the bearing apparatus and the environment.

The ferrofluid seal apparatus comprises a radially-polarized annular permanent magnet, such as a nylon or plastic permanent magnet, or a magnet composed of magnetic metal material; the magnet having a one end and another end. The one end of the radially-polarized end of one polarity of the permanent magnet is placed in a magnetic flux relationship with the inner surface of the outer or outer surface of the inner race elements and typically and preferred in a direct contact so that the entire edge width of the annular permanent magnet across the pole of one polarity is in a direct, contacting, magnetic flux relationship with the inner surface of the race element so that the radially-polarized annular permanent magnet not only acts as a magnet, but also as a single-pole piece to form a single-stage ferrofluid seal. The other radially-polarized end of the opposite polarity of the permanent magnet then is extended into a close, noncontacting relationship with the inner surface of either the inner or outer race element to form a radial gap; for example, of one to six mils.

A ferrofluid is retained in the radial gap so formed by magnetic flux on the annular radially-polarized permanent magnet so that the ferrofluid is retained in the radial gap and adjacent the pole of the opposite polarity. The radial gap may be formed on the outer surface of the inner ring or the inner surface of the outer race, typically to provide a single-stage exclusion-type seal. The annular permanent magnet is placed closely adjacent to the cage means and the moveable element and closely adjacent and toward the environment to be protected so as to act as an exclusion seal to prevent the passage of particles from contaminants into the contamination-free environment.

In operation, the magnetic flux lines of the radially polarized annular permanent magnet extends through the radially-polarized permanent magnet through the inner and outer race elements and across the radial gap containing the ferrofluid, and through the moveable elements so as to provide for a complete magnetic circuit. The ferrofluid seal-bearing assembly of the invention provides for the magnetic flux circuit to be completed through employing the bearing apparatus and thus all or at least some of the components of the bearing apparatus must be magnetically permeable so as to provide for the completion of the magnetic flux line circuit. It is, of course, recognized that rather than form a single-stage seal, a multiple-stage seal composed of separate sealing O-rings of ferrofluid may also be formed beneath the other end of the radially-polarized, annular, permanent magnet to form a dual- or multiple-stage seal and wherein the gaps between the individual O-ring seals may be pressurized, if desired, to provide a pressurized-type exclusion seal. The radial gaps may form, but the other end of the radially-polarized permanent magnet by grooves or knife edges in the polarized end of the magnet, or formed on the opposite inner surface of the inner and outer race elements.

The compact, composite, ferrofluid seal bearing assembly of the invention is particularly useful due to its compact design and finds use in high-speed computer disk drive assembly or other high-speed spindles, where both sealing functions and hydrodynamic bearing functions are desired.

The invention will be described for the purposes of illustration only in connection with certain embodiments; however, it is recognized that those persons skilled in the art may make various changes and modifications and improvements in the ferrofluid seal bearing assembly as illustrated, all falling within the spirit and scope of the invention.

DESCRIPTION OF THE EMBODIMENTS

Figure 1:
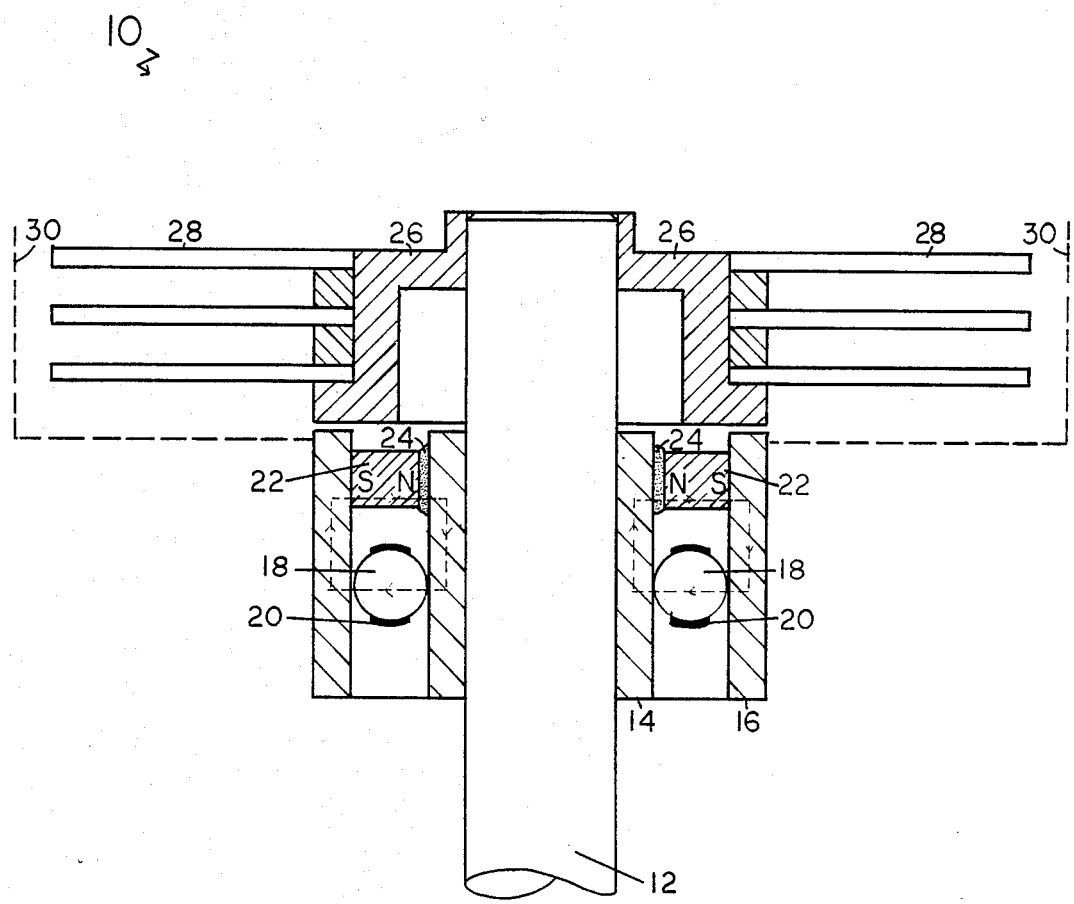
FIG. 1 is an illustrated sectional view of the composite ferrofluid seal-bearing assembly of the invention used with a computer disk drive assembly.

FIG. 1 illustrates a single-stage, compact, composite ferrofluid seal-bearing assembly 10 of the invention which includes a rotatable shaft 12 and having an inner race element 14 secured to the shaft for rotation therewith and a spaced-apart outer race element 16 and moveable ball bearings 18 disposed between the inner and outer races 14 and 16, the ball bearings retained within the race elements by ball bearing cage 20. The inner and outer race 14 and 16 and the ball bearings 18 are composed of a magnetically-permeable material, such as a magnetically-permeable metal or a magnetically-permeable plasticc material, such as nylon containing magnetic particles therein. Closely adjacent the ball bearings 18 and the cage 20 is disposed in an annular, polarized, permanent magnet 22 having poles of opposite polarity disposed in a radial direction; for the purposes of illustration only, the north pole disposed inwardly toward the rotatable shaft. The radially-polarized permanent magnet 22 has one full edge disposed in a close-sealing contact with the inner surface of the outer race element 16 while the opposite polar end of the permanent magnet 22 forms a radial gap of 2–6 mils in thickness from the outer surface of the inner ring element 14 and a ferrofluid 24 is disposed in the radial gap to provide a single-stage ferrofluid exclusion seal. The ferrofluid seal apparatus is placed between the bearing apparatus and a contamination-free area 30 illustrated by dotted lines, which area contains a computer disk drive secured for rotation to let the end of the shaft 12 and containing thereon computer disks which are to be protected in operation from contamination.

As illustrated in the drawings, the magnetic flux circuit as shown in dotted lines with illustrative-type arrows with the magnetic flux lines passing through the annular permanent magnet 22, the ferrofluid 24 in the radial gap, the inner and outer race 14 and 16, and the ball bearings 18. The radially-polarized annular permanent magnet 22 is illustrated a forming a single-stage ferrofluid seal and wherein the annular magnet acts as a pole piece with direct contact into the magnetically-permeable outer race 16 and also functions as the permanent magnet. The assembly so illustrated is a composite, very-compact design to provide both seal and radial bearing capabilities to the assembly.

Figure 2:
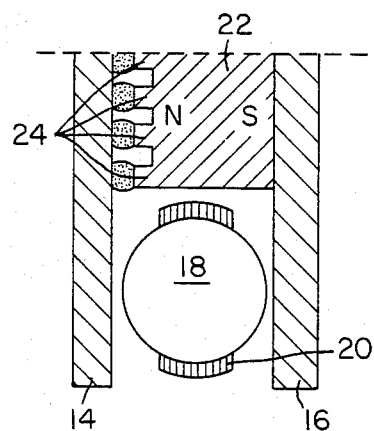
FIG. 2 is an illustrated sectional, partial view of a multiple-stage seal bearing assembly of the invention.

FIG. 2 is an illustrated partial, sectional view of the ferrofluid bearing assembly wherein the one end of the permanent magnet 22 has edges formed therein to provide a plurality of separate spaced apart ferrofluid O-ring seals 24 about the shaft 12 with the closed magnetic flux lines as illustrated.

What is claimed is:

1. A compact ferrofluid seal and radial bearing assembly adapted to provide a ferrofluid seal and radial support to a rotatable shaft, which assembly comprises:
   (a) a magnetically permeable bearing means to support a rotatable shaft which bearing means is composed of an inner and outer spaced-apart race elements, a plurality of moveable elements disposed between the inner and outer race elements and a cage means to retain the moveable elements within the race elements, the inner and outer race elements adapted for movement relative to each other and the moveable elements;
   (b) a ferrofluid seal means to seal the rotatable shaft, which ferrofluid seal apparatus comprises a radially-polarized, annular, permanent magnet which acts as both a pole piece and a magnet having a one end and another end, the one radially-polarized end of one polarity of the peramanent magnet in a magnetic flux relationship with the inner or outer race element and the other radially-polarized end of the opposite polarity of the magnet extending into a close, noncontacting relationship with the inner surface of the outer or the outer surface of the inner race element to define a radial gap and ferrofluid retained in the radial gap by magnetic flux from the radially polarized permanent magnet to provide a ferrofluid exclusion seal adjacent the one side of the bearing means; and
   (c) the magnetic flux lines of the ferrofluid seal apparatus forming a complete closed magnetic flux circuit passing through the radially-polarized magnet, the ferrofluid in the radial gap, the inner and outer race, and the moveable element.

2. The assembly of claim 1 wherein the moveable elements of the bearing means comprise ball bearings.

3. The assembly of claim 1 which includes a rotatable shaft secured for rotation with the inner race element.

4. The assembly of claim 1 wherein the ferrofluid seal apparatus forms a single-stage ferrofluid O-ring exclusion seal in the radial gap.

5. The assembly of claim 1 wherein the ferrofluid seal apparatus has the one end of the radially-polarized permanent magnet in direct contact along its edge width with the outer surface of the inner or inner surface of the outer race elements.

6. The assembly of claim 1 which includes a plurality of radial gaps beneath the one end of the radially-polarized permanent magnet to form a plurality of separate ferrofluid O-ring seals.

7. A computer disk drive system which includes a computer disk drive within a contamination-free environment and a rotatable shaft to drive the computer disk drive and the compact ferrofluid seal and radial bearing of claim 1 to provide support for and to seal said shaft with the ferrofluid seal apparatus disposed on the contamination-free side of the environment.

8. A compact ferrofluid seal and radial bearing assembly which comprises:
  (a) a rotatable shaft which passes into a contamination-free environment;
  (b) a radial bearing means to provide support for the shaft which comprises an inner and a spaced-apart outer race elements, the inner and outer race elements adapted for movement relative to each other and the inner race element secured to the rotatable shaft, a plurality of ball bearing elements disposed between the inner and outer race elements, and a ball bearing cage means to retain the ball bearings within the inner and outer race elements, the inner and outer race elements and the ball bearing elements composed of a magnetically-permeable material;
  (c) a ferrofluid seal apparatus means to seal the said shaft and positioned between the inner and outer race elements and toward the contamination-free environment to be protected, which ferrofluid seal means comprises a single, radially-polarized, annular permanent magnet and pole piece having a one end and another end, one radially-polarized end in a direct, magnetic-flux, contacting relationship with the outer surface of the inner or the inner surface of the outer race elements and the other radially-polarized end of opposite polarity of the permanent magnet extending into a close, noncontacting relationship with the inner surface of the outer or the outer surface of the inner race element to define a radial gap and ferrofluid retained in the radial gap by the magnetic flux in the gap from the radially polarized magnet to form at least a single-stage ferrofluidic exclusion seal about the said shaft; and
  (d) the magnetic flux lines forming a complete closed magnet circuit passing from the radially-polarized permanent magnet through the ferrofluid in the radial gap and the inner and outer race and the ball bearing elements.

\* \* \* \* \*